(12) United States Patent
Park (10) Patent No.: US 7,988,182 B2
(45) Date of Patent: Aug. 2, 2011

(54) ROOF-SIDE STRUCTURE OF VEHICLE

(75) Inventor: Hyeong Gyu Park, Gyeonggi-do (KR)

(73) Assignee: Hyundai Motor Company, Seoul (KR)

(*) Notice: Subject to any disclaimer, the term of this patent is extended or adjusted under 35 U.S.C. 154(b) by 120 days.

(21) Appl. No.: 12/323,348

(22) Filed: Nov. 25, 2008

(65) Prior Publication Data

US 2010/0052369 A1    Mar. 4, 2010

(30) Foreign Application Priority Data

Aug. 28, 2008    (KR) ................ 10-2008-0084467

(51) Int. Cl.
*B60R 21/213*    (2011.01)
(52) U.S. Cl. .............. 280/728.2; 280/730.2; 296/210
(58) Field of Classification Search .......... 280/728.2, 280/730.2, 728.3; 296/210, 214
See application file for complete search history.

(56) References Cited

U.S. PATENT DOCUMENTS

| | | | |
|---|---|---|---|
| 6,843,502 B2* | 1/2005 | Aoki et al. ............ | 280/730.2 |
| 6,974,151 B2* | 12/2005 | Ochiai et al. ........... | 280/728.2 |
| 7,159,896 B2* | 1/2007 | Ochiai et al. ........... | 280/730.2 |
| 7,172,212 B2* | 2/2007 | Aoki et al. ............ | 280/730.2 |
| 7,568,757 B2* | 8/2009 | Romig ................. | 296/213 |
| 7,661,704 B2* | 2/2010 | Chen et al. ............ | 280/730.2 |
| 7,694,998 B2* | 4/2010 | Hidaka ............... | 280/728.2 |
| 2007/0152431 A1* | 7/2007 | Rust et al. ............ | 280/730.2 |

FOREIGN PATENT DOCUMENTS

| | | |
|---|---|---|
| JP | 09-076938 | 3/1997 |
| JP | 11-321706 A | 11/1999 |
| JP | 2007-230408 A | 9/2007 |
| KR | 10-0783933 B1 | 12/2007 |

* cited by examiner

*Primary Examiner* — Ruth Ilan
*Assistant Examiner* — Timothy D Wilhelm
(74) *Attorney, Agent, or Firm* — Morgan, Lewis & Bockius LLP (57) ABSTRACT

A roof-side structure includes a roof center rail which is engaged with the bottom surface of a roof panel and one end of which extends to a position of a curtain airbag, a roof rail gusset engaged between a roof side outer reinforcing panel and the one end of the roof center rail, and a side inner panel which is engaged with the roof rail gusset in a state that a curtain airbag is engaged with a front side of the one end of the roof center rail. Accordingly, since the roof rail gusset is arranged inside of the side inner panel so that it does not interfere with the curtain airbag, a layout of the curtain airbag is advantageous. Also, since it is not required to bend the roof rail gusset to connect the roof center rail and the side inner panel, in the event a broadside collision is applied to a vehicle, the roof rail gusset remains unbroken, and thus the rigidity of the roof center rail can be sufficiently reinforced.

4 Claims, 11 Drawing Sheets

ROOF-SIDE STRUCTURE OF VEHICLE

CROSS-REFERENCE TO RELATED APPLICATION

The present application claims priority to Korean Patent Application No. 10-2008-0084467, filed on Aug. 28, 2008, the entire contents of which are incorporated herein for all purposes by this reference.

BACKGROUND OF THE INVENTION

1. Field of the Invention

The present invention relates to a roof-side structure of a vehicle, more specifically, to a roof-side structure of a vehicle in which a curtain airbag does not interfere with a roof rail gusset. When a broadside collision is applied to a vehicle, the roof rail gusset remains unbroken and thus the rigidity of a roof center rail is sufficiently reinforced.

2. Description of Related Art

Figure 1A:
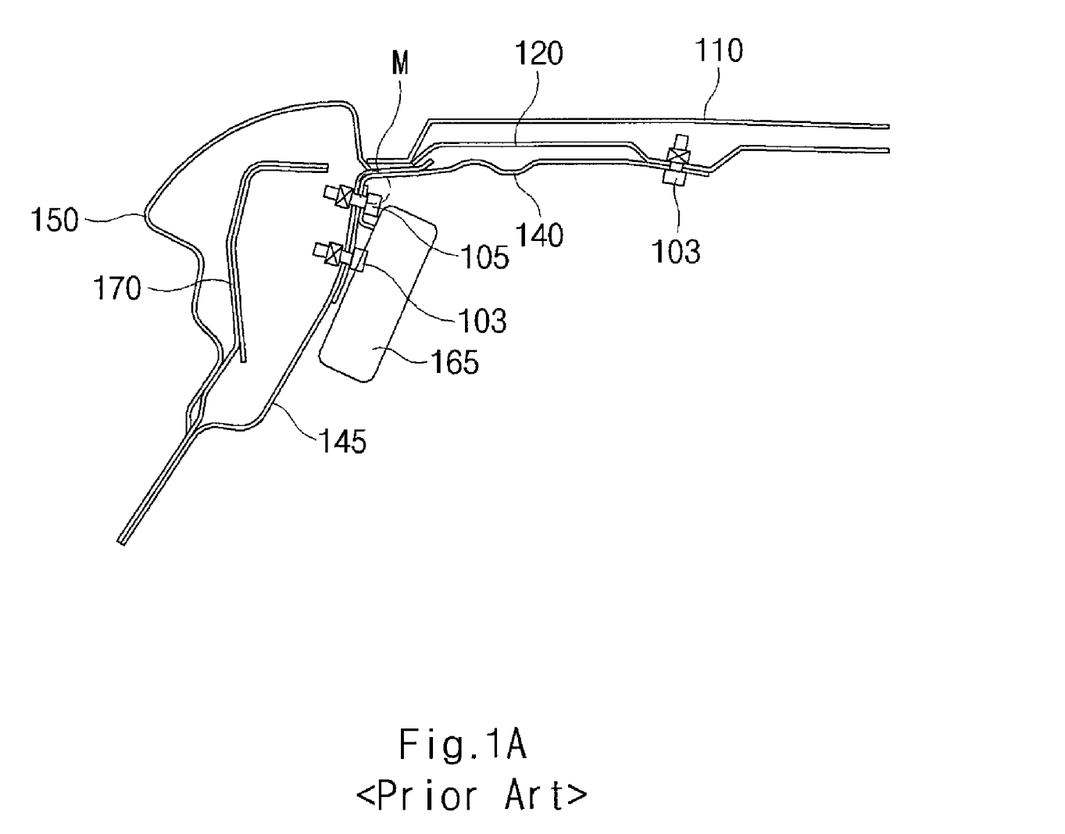
FIG. 1A is a sectional view illustrating a conventional roof-side structure of a vehicle.

Generally, a roof-side structure of a conventional vehicle includes, as shown in FIG. 1A, a roof panel 110 which is engaged with a roof center rail 120 on its bottom surface, a side inner panel 145 and a side outer panel 150. These components are connected to a side of the roof panel 110 and engaged with each other having a center pillar outer reinforcing panel 170 interposed between them. A roof rail gusset 140 which is engaged with the roof center rail 120 at its one end by a first fastening member 103 and engaged with the side inner panel 145 at its other end by a second fastening member 105, and thus reinforces the rigidity of the roof center rail 120.

In this case, a curtain airbag 165 is engaged with the side inner panel 145. Specifically, the curtain airbag 165 is integrally engaged with the side inner panel 145 by a second fastening member 105.

However, according to the conventional roof-side structure of a vehicle, the roof rail gusset 140 should be constituted such that a part indicated as "M" in FIG. 1A is bent to avoid interference with the curtain airbag 165 mounted at the outside of the side inner panel 145. As a consequence, there exists a problem when broadside collision energy is applied to a vehicle body, the roof rail gusset 140 is broken because it does not sufficiently withstand a rotation moment that occurs at the roof center rail 120.

Figure 1B:
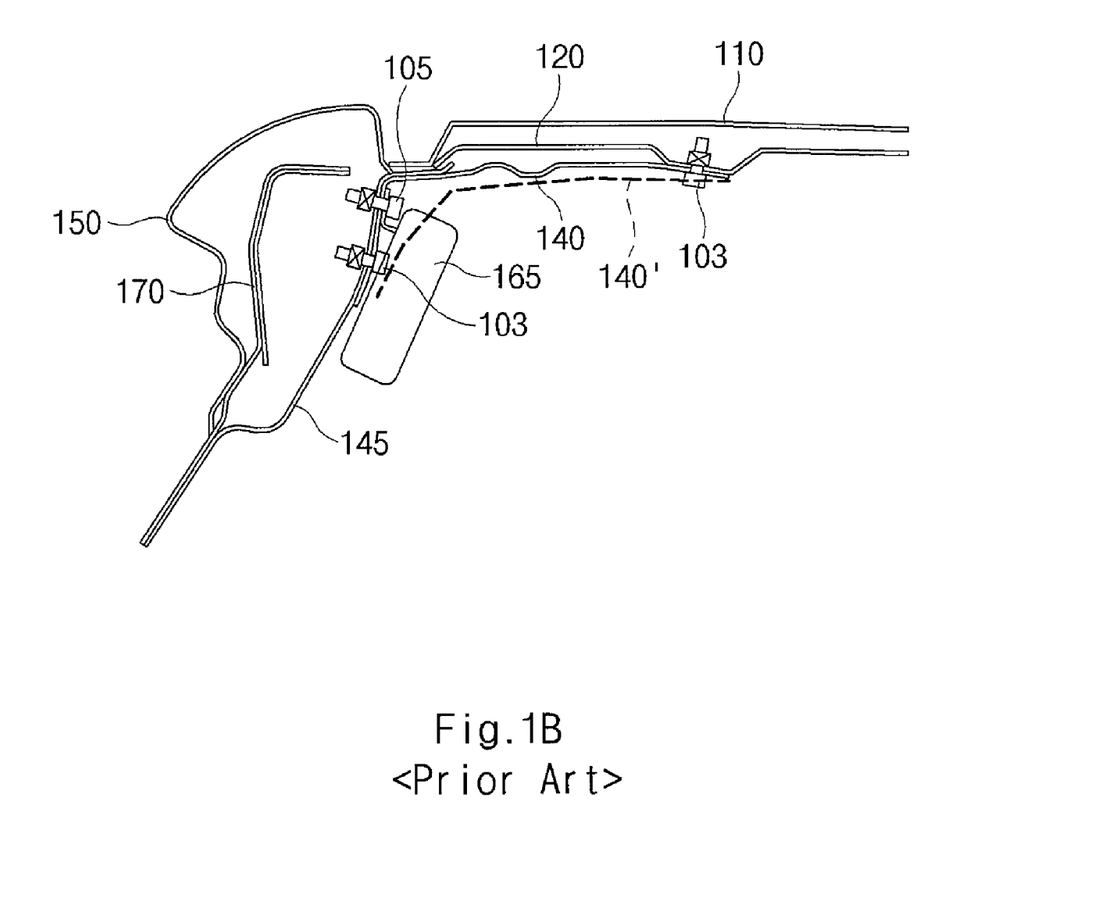
FIG. 1B is a sectional view illustrating a state when a section of a roof rail gusset is enlarged, a curtain airbag interferes with the roof rail gusset.

However, when a section of the roof rail gusset 140' is enlarged as shown in FIG. 1B to ensure the rigidity of the roof rail gusset 140, a problem may exist where the curtain airbag 165 interferes with the roof rail gusset 140'.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a roof-side structure of a vehicle wherein a curtain airbag does not interfere with a roof rail gusset. In the event when a broadside collision is applied to a vehicle, the roof rail gusset remains unbroken, and thus the rigidity of a roof center rail can be sufficiently reinforced.

In an aspect of the present invention, a roof-side structure of a vehicle may include a roof center rail, one end of which extends to a portion of a curtain airbag and the other end of which is engaged with a bottom surface of a roof panel, a roof rail gusset engaged between a roof side outer reinforcing panel and the one end of the roof center rail, and/or a side inner panel, one end of which is coupled to the roof rail gusset, wherein the curtain airbag is coupled to a rear side of the one end of the side inner panel.

The roof rail gusset, the one end of the roof center rail, the one end of the side inner panel, and the curtain airbag may be commonly coupled by a fastening member in series.

The fastening member may be bolt and nut.

The roof rail gusset may include a gusset body coupled to the one end of the roof center rail, and/or first and second flanges bent from both distal ends of the gusset body toward the roof side outer reinforcing panel respectively and engaged with the roof side outer reinforcing panel.

The gusset body of the roof rail gusset, the one end of the roof center rail, the one end of the side inner panel, and the curtain airbag may be commonly coupled by a fastening member in series. The fastening member may be bolt and nut.

The first and second flanges may be inclined downwards with respect to a horizontal axis with a predetermined angle respectively.

In another aspect of the present invention, the roof side part may further include a third flange integrally extending from end of the second flange downwards with a predetermined angle therebetween.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
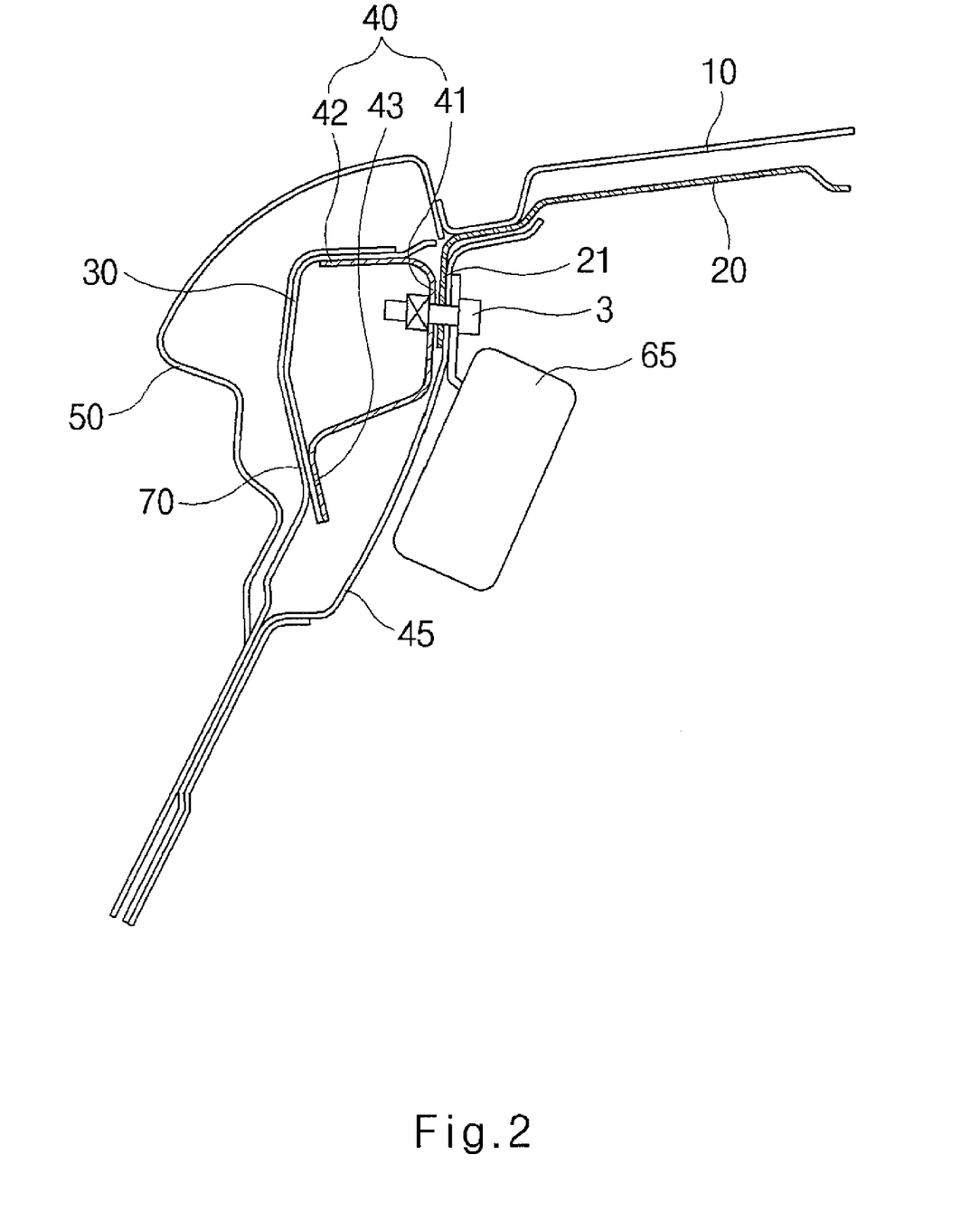
FIG. 2 is a sectional view illustrating a roof-side structure of a vehicle according to an exemplary embodiment of the present invention.
Figure 3:
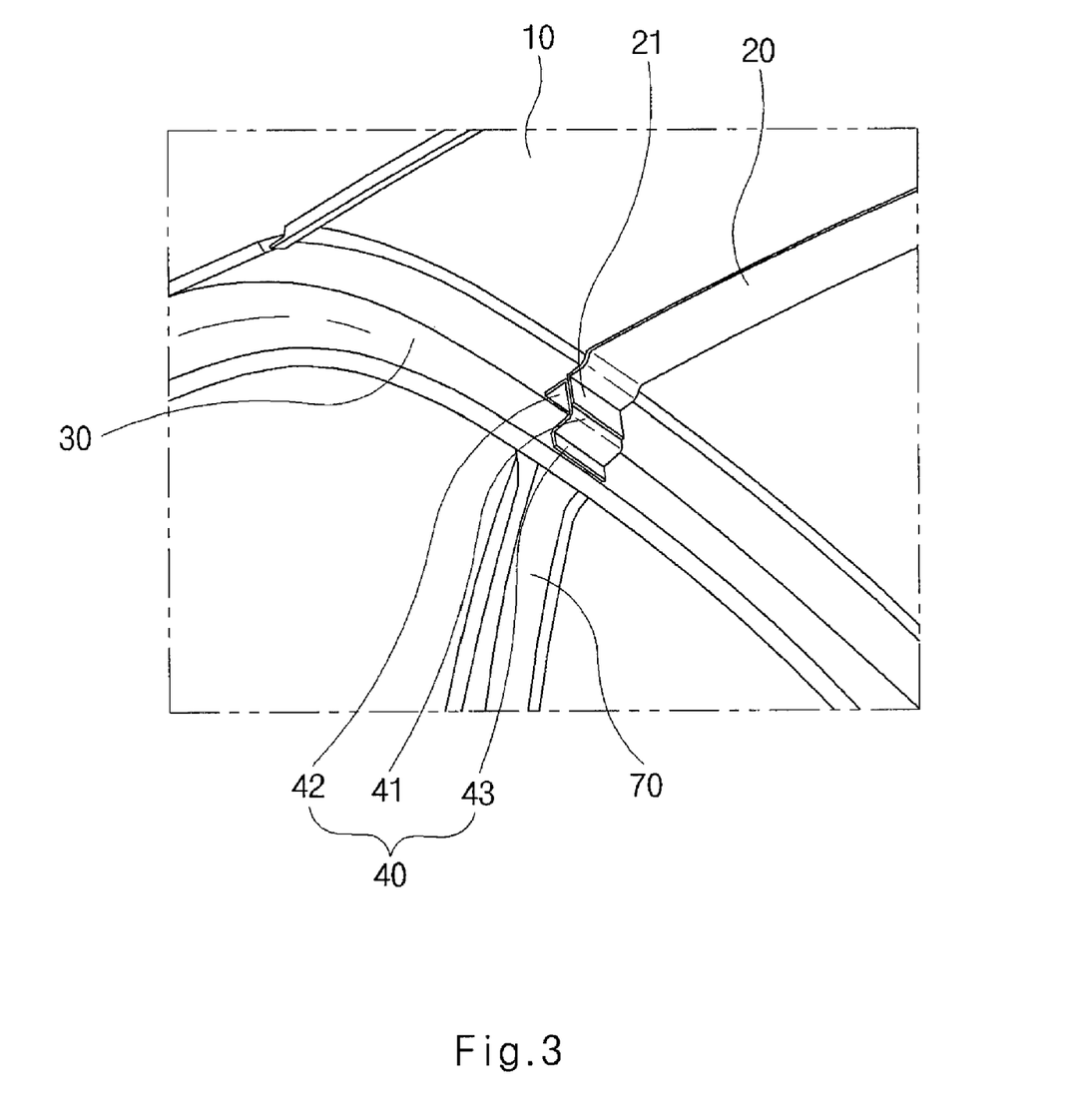
FIG. 3 is a perspective view illustrating the state that the roof rail gusset of FIG. 2 is engaged between one end of the roof center rail and the roof side outer reinforcing panel.

As shown in FIG. 2 and FIG. 3, a roof-side structure of a vehicle according to an exemplary embodiment of the present invention includes a roof center rail 20 which is engaged with a bottom surface of a roof panel 10, a roof rail gusset 40 engaged between a roof side outer reinforcing panel 30 and one end of the roof center rail 20 for reinforcing the rigidity of the roof center rail 20, a side inner panel 45 which is engaged with the roof rail gusset 40 in a state that a curtain airbag 65 is engaged with a front side of the one end 21 of the roof center rail 20, and a side outer panel 50 which is connected to the side inner panel 45 with a center pillar outer reinforcing panel 70 on outer side of the roof side outer reinforcing panel 30 interposed between them.

The one end 21 of the roof center rail 20 extends to a position to the curtain airbag 65 to be engaged with an inner surface of the side inner panel 45, and the roof rail gusset 40 is engaged between one end 21 of the roof center rail 20 and the roof side outer reinforcing panel 30.

That is, one of the important characteristics of the present invention is that after one end 21 of the roof center rail 20 extends to a position of the curtain airbag 65, the roof rail gusset 40 is engaged with the roof side outer reinforcing panel 30 arranged inside of the side inner panel 45 so that it does not interfere with the curtain airbag 65, and then is connected to the roof center rail 20.

Accordingly, since the curtain airbag 65 does not interfere with the roof rail gusset 40, a layout of the curtain airbag 65 is advantageous. Further, since it is not required to bend the roof rail gusset 40 to connect the roof center rail 20 and the side inner panel 45, respectively, in the event a broadside collision is applied to a vehicle, the roof rail gusset 40 remains unbroken, and thus the rigidity of the roof center rail 20 can be sufficiently reinforced.

Furthermore, the opening of the roof rail gusset 40 in an exemplary embodiment of the present invention is aligned outwards as shown in FIG. 3. Since the protruding direction of the distal ends of the roof rail gusset 40 is disposed opposite the direction of the impact the broadside impact can be effectively absorbed. In contrast, the opening of the roof rail gusset 140 in the conventional art illustrated at FIG. 1 is aligned inwards. In this configuration, since the protruding direction of the distal ends of the roof rail gusset 140 is disposed substantially in parallel to the direction of the impact the broadside impact can bring more rotation moment than the exemplary embodiment of the present invention to the distal ends of the roof rail gusset 140 so that the broadside impact cannot be effectively absorbed.

In this case, the roof rail gusset 40 includes a gusset body 41 which is integrally engaged with one end 21 of the roof center rail 20, and a pair of flanges 42 and 43 which are bent from both ends of the gusset body 41 to the roof side outer reinforcing panel 30 and integrally engaged with the roof side outer reinforcing panel 30. As described above, since the roof rail gusset 40 is formed of the triple sections, its sectional area becomes larger than that of the conventional roof rail gusset 140 of double sections, and its moment of inertia of area increases. Thus, the rigidity of the roof center rail 20 can be improved greatly.

On the other hand, the curtain airbag 65 and the roof rail gusset 40 are commonly mounted by a fastening member 3 with the one end 21 of the roof center rail 20 and the side inner panel 45 interposed between them. Accordingly, the number of the fastening member is reduced, and thus it is possible to reduce the manufacturing cost.

That is, in the conventional structure as described above, the first fastening member 103 is used for connecting the roof rail gusset 140 to the roof center rail 120 and the side inner panel 145, respectively and the second fastening member 105 is used for engaging the curtain airbag 165 with the side inner panel 145. Thus, since the fastening members 103 and 105 for mounting the curtain airbag 165 and the roof rail gusset 140, respectively are not commonly used, a plurality of the fastening member is required. Whereas, according to the present invention, since the roof rail gusset 40 and the curtain airbag 65 are commonly mounted, the number of fastening member 3 can be reduced.

Under such a configuration, we will briefly explain a sequence for assembling the roof-side structure of a vehicle according to an exemplary embodiment of the present invention with reference to FIGS. 4 to 7.

Figure 4:
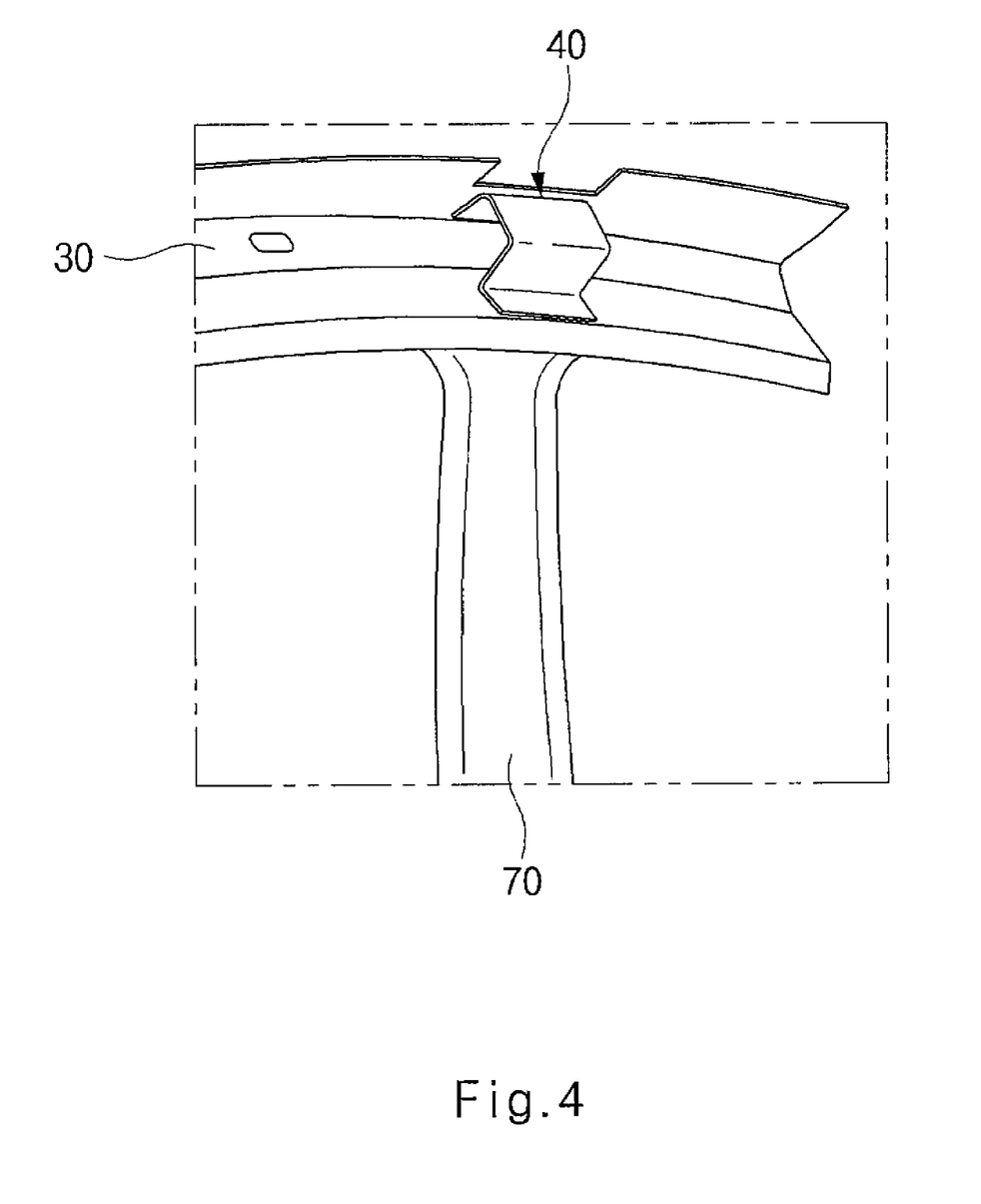
FIGS. 4 to 7 show a sequence for assembling a roof-side structure of a vehicle according to an exemplary embodiment of the present invention.

First, as shown in FIG. 4, the roof rail gusset 40 is welded to the roof side outer reinforcing panel 30 to be integrally engaged with it.

Figure 5A:
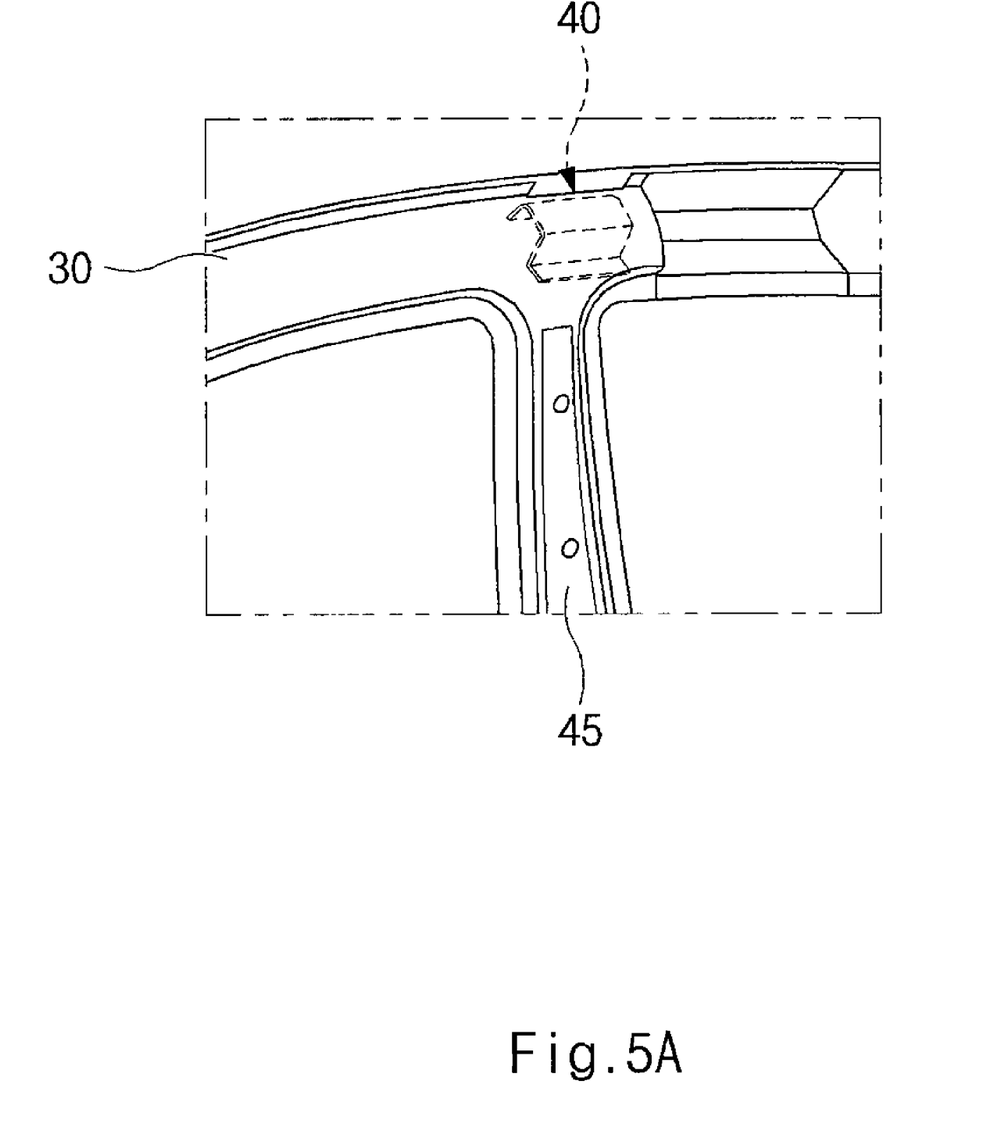
Figure 5B:
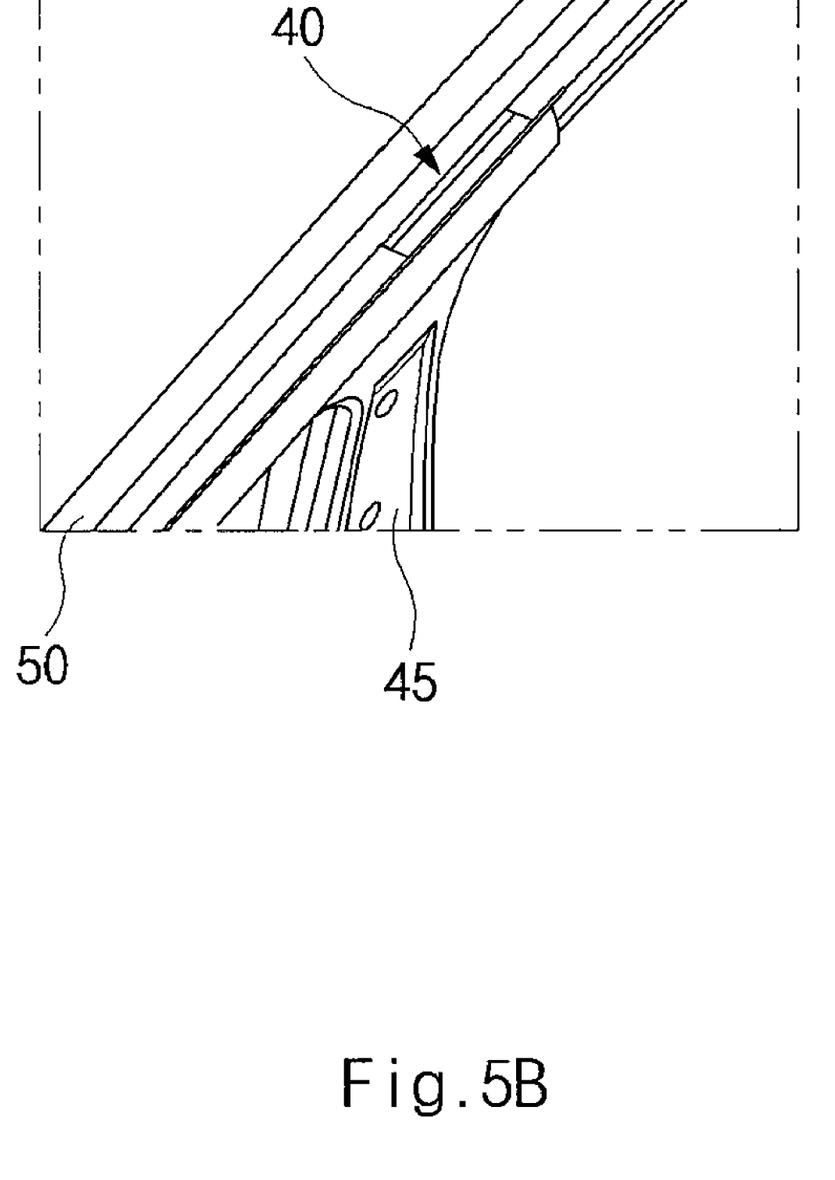

Then, as shown in FIGS. 5A and 5B, the side inner panel 45 and the side outer panel 50 are integrally welded in a state that the side inner panel 45 is arranged outside of the roof rail gusset 40, and the side outer panel 50 is arranged outside of the roof side outer reinforcing panel 30 with the center pillar outer reinforcing panel 70 interposed between them.

Figure 6A:
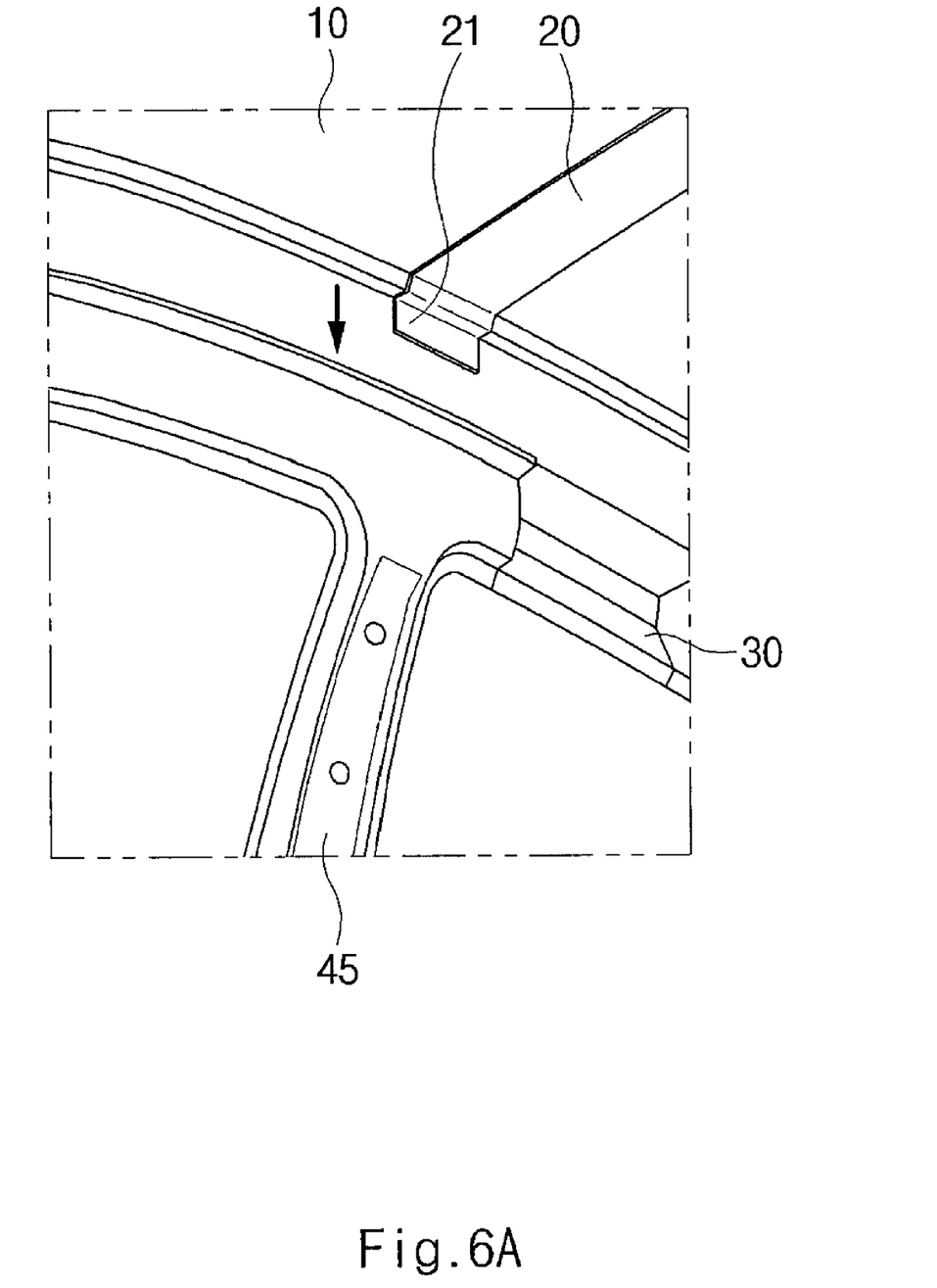
Figure 6B:
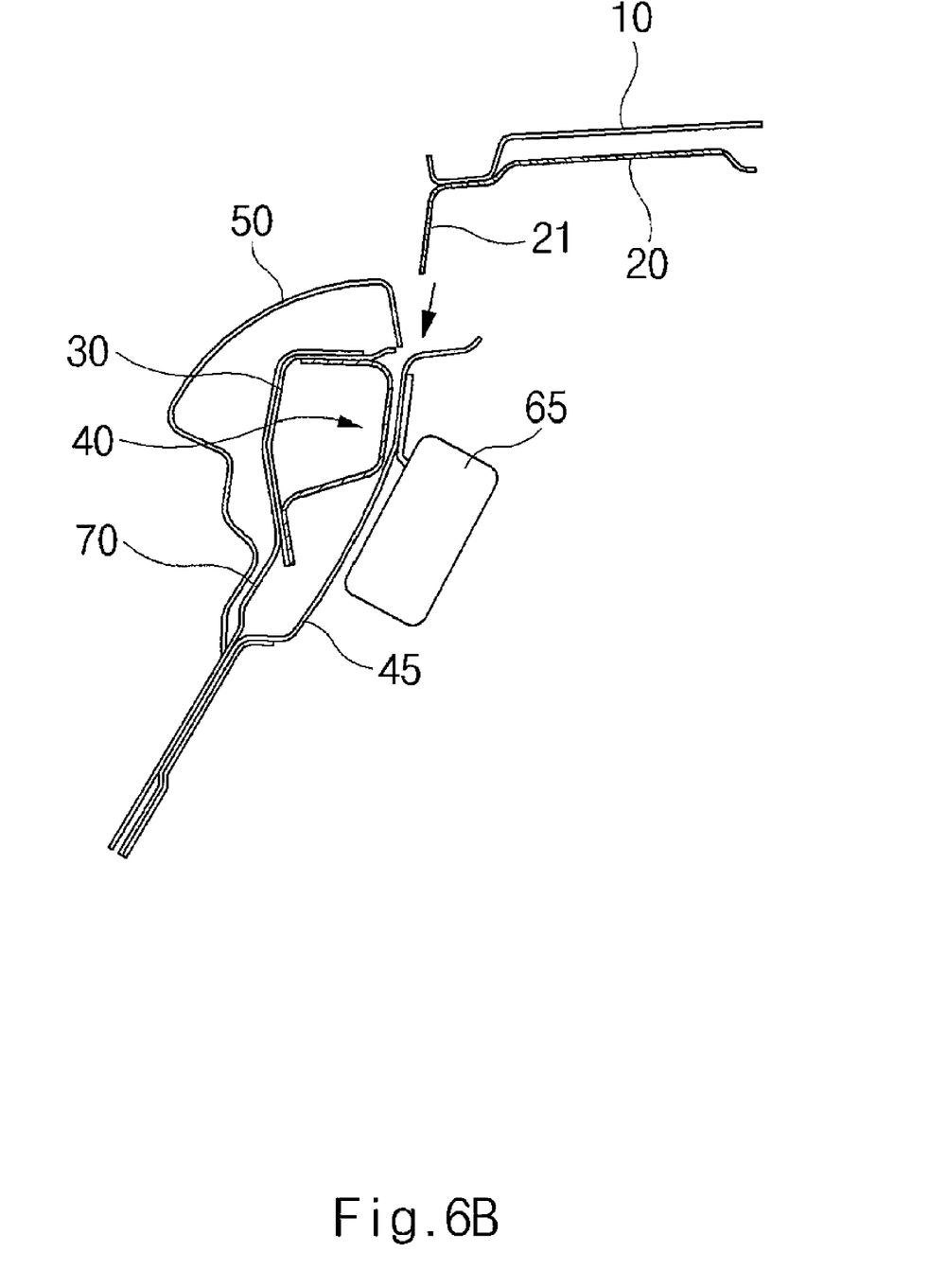

Next, as shown in FIG. 6A, after the roof center rail 20 is integrated with a bottom surface of the roof panel 10, one end 21 of the roof center rail 20 is inserted between the side inner panel 45 and the roof rail gusset 40 as shown in FIG. 6B.

Figure 7A:
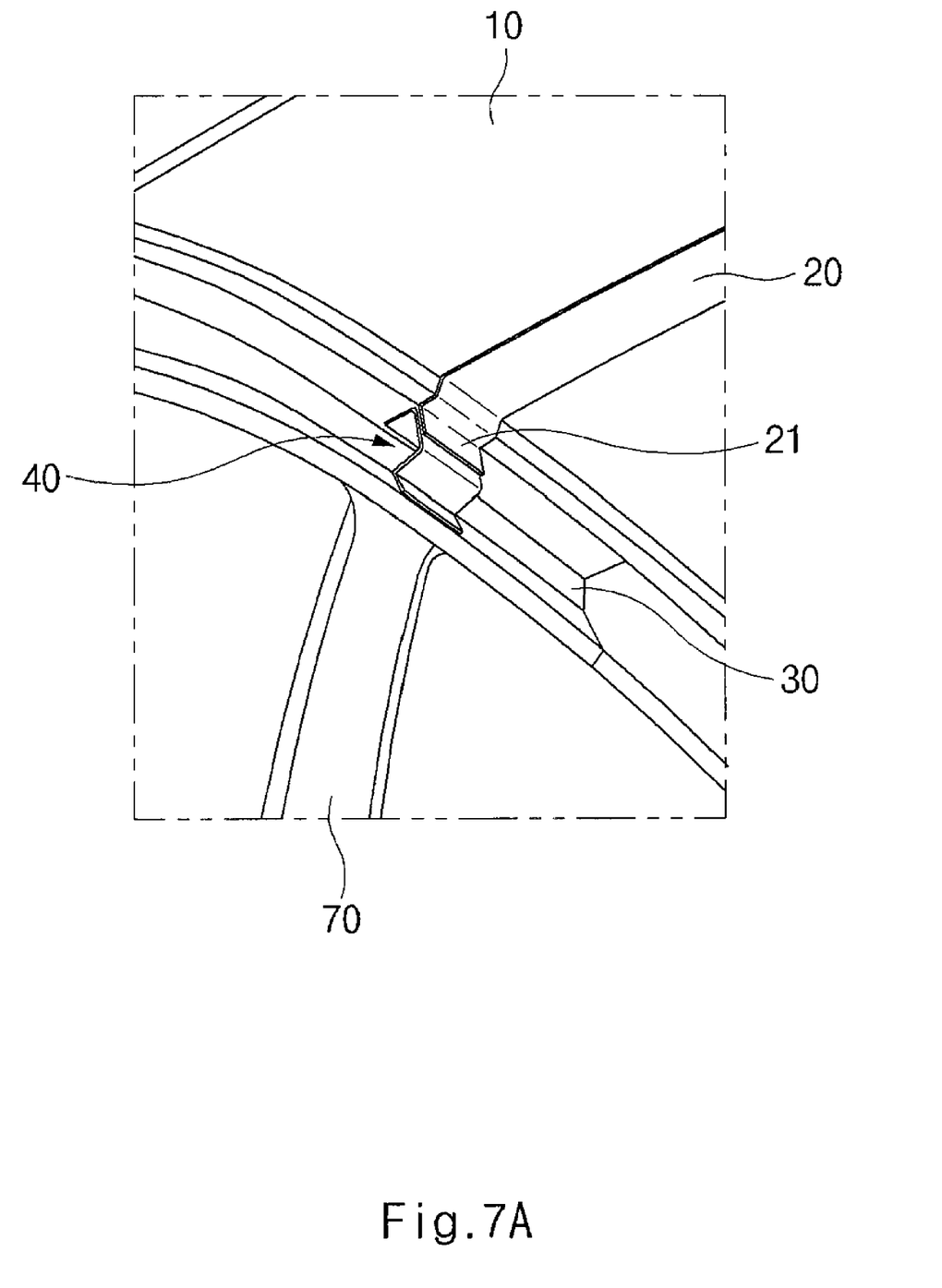
Figure 7B:
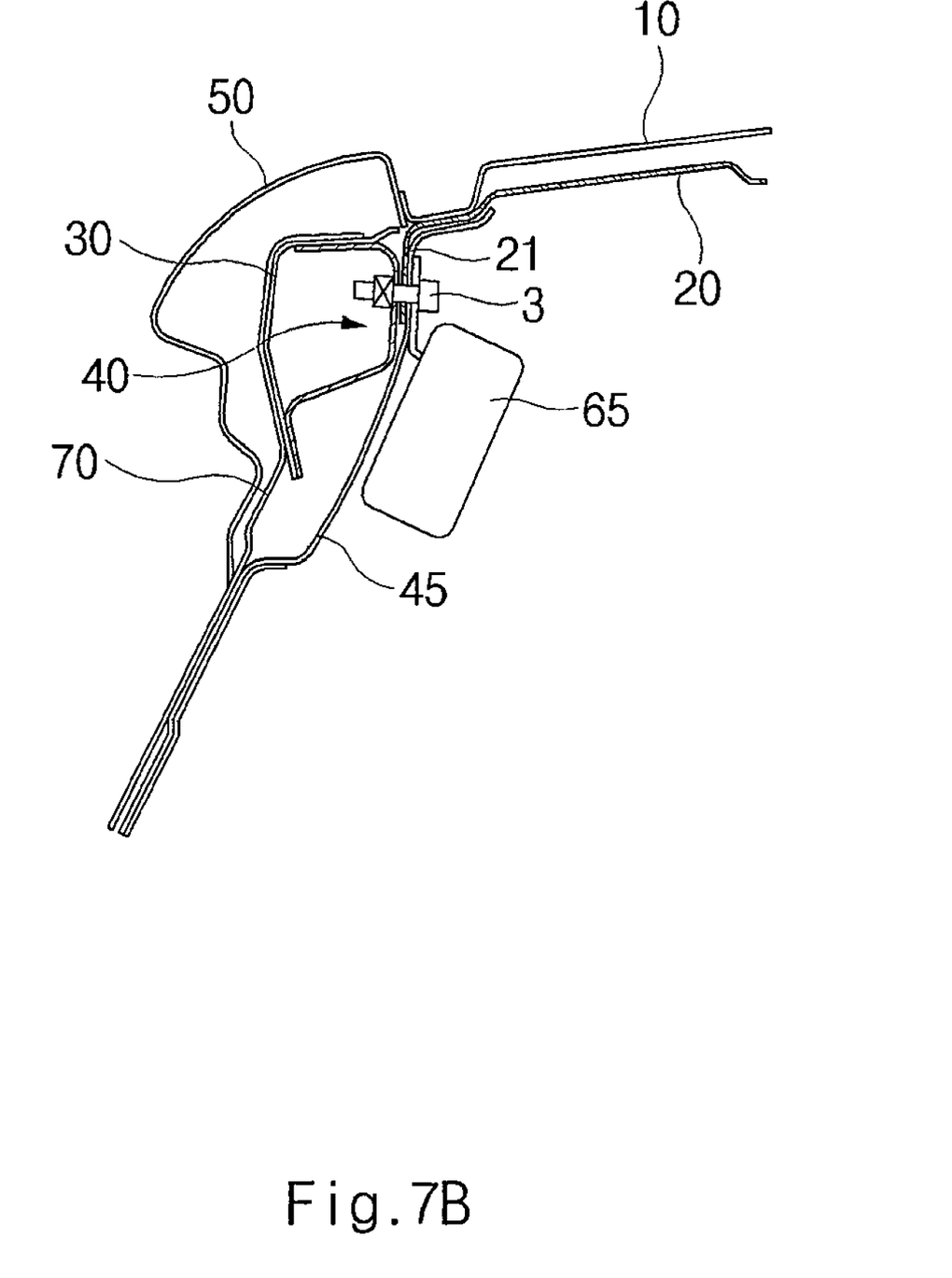

Finally, as shown in FIGS. 7A and 7B, the side inner panel 45, the one end 21 of the roof center rail 20, and the roof rail gusset 40 are fastened by the fastening member 3 to connect the roof center rail 20 to the roof rail gusset 40, which completes the assembly process.

As described above, in regard to the roof-side structure of a vehicle according to an exemplary embodiment of the present invention, since the roof rail gusset 40 is arranged inside of the side inner panel 45 so that it does not interfere with the curtain airbag 65, a layout of the curtain airbag 65 is advantageous.

Also, since it is not required to bend the roof rail gusset 40 to connect the roof center rail 20 and the side inner panel 45 and the opening of the roof rail gusset 40 is aligned outwards, in the event a broadside collision is applied to a vehicle, the roof rail gusset 40 can effectively absorb the impact, and thus the rigidity of the roof center rail 20 can be sufficiently reinforced.

For convenience in explanation and accurate definition in the appended claims, the terms "front", "outer", and "inner" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A roof-side structure of a vehicle, comprising:
   a roof center rail, one end of which extends to a portion of a curtain airbag and the other end of which is engaged with a bottom surface of a roof panel;
   a roof rail gusset engaged between a roof side outer reinforcing panel and the one end of the roof center rail; and
   a side inner panel, one end of which is coupled to the roof rail gusset, wherein the curtain airbag is coupled to a rear side of the one end of the side inner panel;

wherein the roof rail gusset comprises:
  a gusset body coupled to the one end of the roof center rail;
  first and second flanges bent from both distal ends of the gusset body, the first flange being bent toward the roof side outer reinforcing panel and engaged with the roof side outer reinforcing panel and the second flange being bent downwards with respect to a horizontal axis with a predetermined angle; and
  a third flange integrally extending from an end of the second flange downwards with a predetermined angle therebetween and connected to the roof side outer reinforcing panel;
wherein after the first and third flanges of the roof rail gusset are welded with the roof side outer reinforcing panel, the side inner panel welded with the curtain airabg and disposed at the outer side of the roof rail gusset is welded with a center pillar outer reinforcing panel disposed at the outer side of the roof side outer reinforcing panel, one end of the roof center rail intergrated in the bottom surface of the roof panel is inserted into a gap between the side inner panel and the gusset body; and
wherein the curtain airbag, the one end of the side inner panel, the end of the roof center rail and the guesset body of the roof rail gusset are mounted in common with a fastening member.

2. A passenger vehicle comprising the roof-side structure as claimed in claim 1.

3. The roof-side structure of a vehicle of claim 1, wherein the first and second flanges extend outwards to form an opening therebetween.

4. The roof-side structure of a vehicle of claim 1, wherein a portion in which the roof side outer reinforcing panel and the third flange of the roof rail gusset is connected is not connected to the side inner panel.

* * * * *